United States Patent
Yamagiwa et al.

(10) Patent No.: US 6,672,352 B2
(45) Date of Patent: *Jan. 6, 2004

(54) TUBE-INCORPORATED TIRE

(75) Inventors: Toshio Yamagiwa, Saitama-ken (JP); Hirohisa Takahashi, Saitama-ken (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/459,885

(22) Filed: Dec. 14, 1999

(65) Prior Publication Data

US 2002/0066511 A1 Jun. 6, 2002

Related U.S. Application Data

(63) Continuation of application No. 08/983,135, filed as application No. PCT/JP96/03743 on Dec. 20, 1996, now abandoned.

(30) Foreign Application Priority Data

Dec. 26, 1995  (JP) ............................................. 7-339372

(51) Int. Cl.[7] .................................................. B60C 5/04
(52) U.S. Cl. ....................................... 152/506; 152/511
(58) Field of Search ................................. 152/511, 512, 152/195, 454, 502–507, 520, 522, 501

(56) References Cited

U.S. PATENT DOCUMENTS

1,014,464 A  *  1/1912  Hall ............................ 152/512
1,258,506 A     3/1918  Wallace (List continued on next page.)

FOREIGN PATENT DOCUMENTS

DE    2231659    *  1/1973    ................. 152/511
EP    0795428       9/1997

(List continued on next page.)

OTHER PUBLICATIONS

Bike Nashbar catalog 107, p. 47, 1995.*

(List continued on next page.)

Primary Examiner—Geoffrey L. Knable
(74) Attorney, Agent, or Firm—Arent Fox Kintner Plotkin & Kahn, PLLC

(57) ABSTRACT

In a tube whose internal space is partitioned by a partition wall to formed an air chamber filled with air and a sealant chamber filled with a sealant, the ratio R (R=B/A) of the length B of an outer circumference of the tube accommodated in the tire and expanded by filling of air to the length A of an outer circumference of the tube in an unexpanded is set in a range of 100% to 110%. Thus, the tension of the partition wall at the time when the tube has been expanded is suppressed to a small extent. Even if the partition wall of the tube gets a punctured wound, the partition wall having only a small tension applied thereto has a weak tendency to be intended to be contracted toward the air chamber. Therefore, little, if any, of the air in the air chamber flows into the sealant chamber and thus, a reduction in sealing performance of the sealant due to the mixture with the air is prevented.

1 Claim, 4 Drawing Sheets

U.S. PATENT DOCUMENTS

| | | | | |
|---|---|---|---|---|
| 1,310,438 A | * | 7/1919 | Roberts | 152/511 |
| 1,419,470 A | | 6/1922 | Reasoner et al. | |
| 1,513,900 A | | 11/1924 | Flood | |
| 1,689,907 A | | 10/1928 | Allen | |
| 2,033,962 A | | 3/1936 | Waber | |
| 2,244,648 A | | 6/1941 | Carnahan | |
| 2,699,194 A | | 1/1955 | Iknayan | |
| 5,591,283 A | * | 1/1997 | Mahling | 152/501 |
| 6,106,647 A | | 8/2000 | Yamagiwa et al. | |
| 6,186,206 B1 | * | 2/2001 | Yamagiwa et al. | 152/520 |

FOREIGN PATENT DOCUMENTS

| | | |
|---|---|---|
| EP | 0818302 | 1/1998 |
| FR | 567685 | 3/1924 |
| GB | 377163 | 1/1931 |
| JP | 30-11601 | 8/1955 |
| JP | 33-4708 | 8/1958 |
| JP | 54-38007 | 3/1979 |
| JP | 54-61704 | 5/1979 |

OTHER PUBLICATIONS

Toshio Yamagiwa et al., Development of Tire Tube with Puncture Resistance Function, Nov. 16–21, 1997.

* cited by examiner

TUBE-INCORPORATED TIRE

This application is a continuation of U.S. Ser. No. 08/983,135 filed Jan. 20, 1998, (hereby incorporated by reference) now abandoned which is a Rule 371 National Stage Application of International Application No. PCT/JP96/03743, filed Dec. 20, 1996.

FIELD OF THE INVENTION

The present invention relates to a tube-incorporated tire which is comprised of a tire mounted around an outer periphery of a rim, and a tube which is accommodated in a space defined by the rim and the tire and which is formed with an air chamber to be filled with air and a sealant chamber filled with a sealant.

BACKGROUND ART

In a usual tube-incorporated tire, if a tube gets a punctured wound caused by a nail or the like, air in the tube is leaked from the punctured wound through a small clearance between the tire and the tube and via a nipple bore in the rim to the outside and, the tire becomes flat.

In view of the above circumstance, a tube-incorporated tire has been proposed in Japanese Patent Application Laid-open No.54-38007, in which the internal space in the tube is partitioned by a partition wall into an air chamber filled with air and a sealant chamber filled with a sealant. In this tube-incorporated tire, even if the tube gets a punctured wound by a nail or the like, such punctured wound can be repaired by the sealant filled in the sealant chamber, thereby preventing the leakage of air from the air chamber.

When the tube is set in the tire, the tube is deflated and mounted within the tire and then, air is filled into the air chamber to expand the air chamber. At that time, the volume of the air chamber in the tube is increased by the filling of the air and for this reason, in the tire with the inside of the tube divided into the air chamber and the sealant chamber, the partition wall is stretched by the increase in volume of the air chamber to generate a tension. If the partition wall gets a punctured wound in this state, the partition wall is intended to be contracted by such tension to compress the air chamber and hence, there is a possibility that the air in the air chamber is forced out through the punctured wound into the sealant chamber, where the air is incorporated into the sealant, resulting in a reduced sealing performance.

DISCLOSURE OF THE INVENTION

Accordingly, it is an object of the present invention to prevent the air in the air chamber from being incorporated into the sealant in the sealant chamber when the partition wall gets a punctured wound.

To achieve the above object, according to the present invention, there is provided a tube-incorporated tire comprising a tire mounted around an outer periphery of a rim, and a tube which is accommodated in a space defined by the rim and the tire and which is formed with an air chamber to be filled with air and a sealant chamber filled with a sealant, wherein the ratio of a length of an outer circumference of the tube in an air-filled state to that of the tube in an air-unfilled state is set in a range of 100% to 110%.

With the above arrangement, the ratio of the length of the contour of the tube in the air-filled state to that of the contour of the tube in the air-unfilled state is set in a range of 100% to 110%, and hence, when air is filled in the air chamber, the tension applied to the partition wall can be reduced. Therefore, even if the partition wall gets a punctured wound, the tendency for the partition wall to reduce the air chamber by the tension is lowered and as a result, it is difficult for the air in the air chamber to flow through the punctured wound into the sealant chamber. Thus, it is possible to avoid the incorporation of the air into the sealant to prevent a reduction in sealing performance.

BRIEF DESCRIPTION OF THE DRAWINGS

FIG. 1 is a cross-sectional view of a wheel having a tube-incorporated tire mounted thereon;

FIG. 2 is a view for explaining the operation in a state in which the wheel has run upon an obstacle;

FIG. 3 is a view for explaining the operation when a tube gets a punctured wound.

BEST MODE FOR CARRYING OUT THE INVENTION

Figure 1:
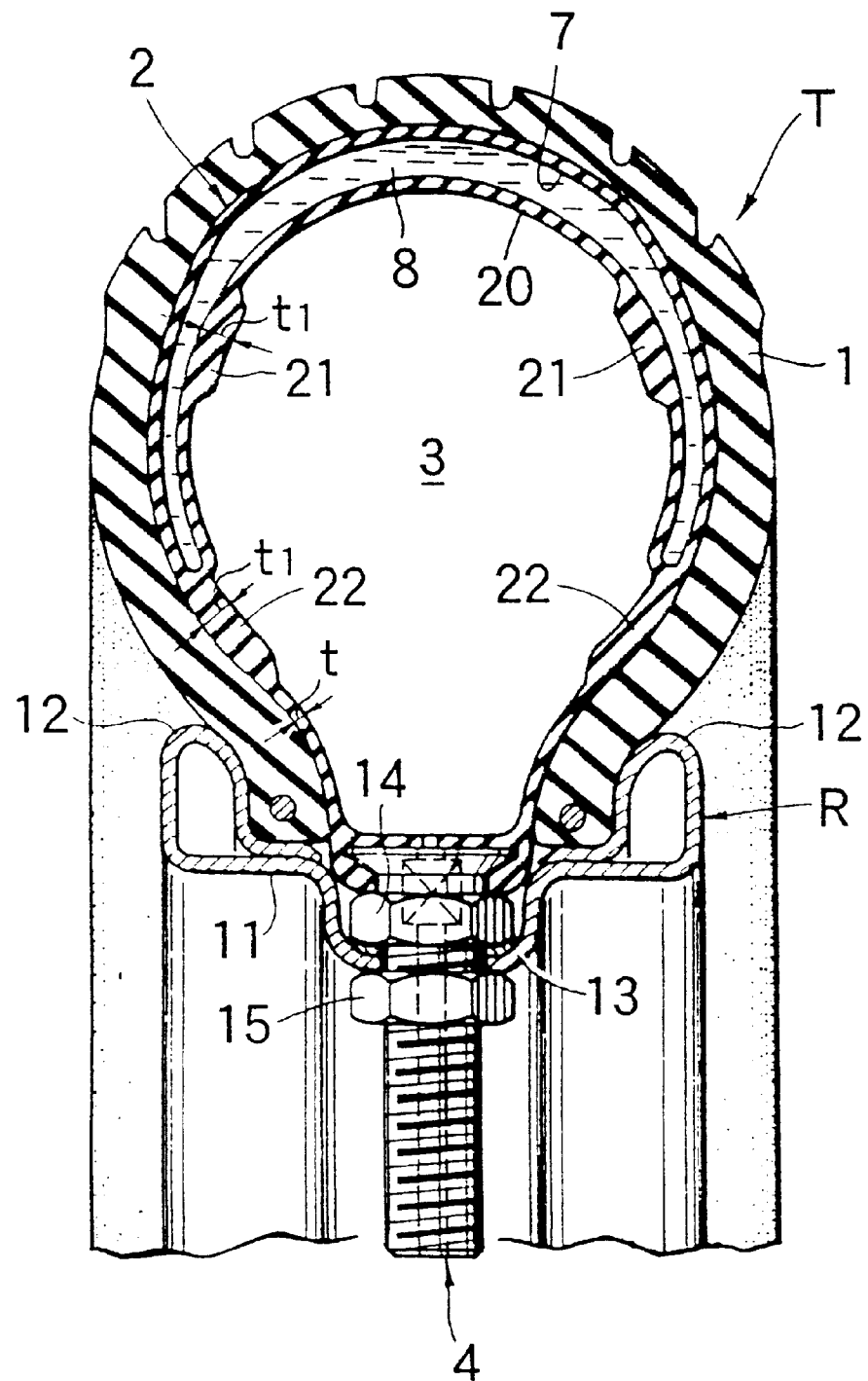
FIGS. 1 to 3 illustrate an embodiment of the present invention.

As shown in FIG. 1, a rim R of a wheel for a motorcycle is connected to a hub (not shown) through wire spokes. A tube-incorporated tire T is mounted on the rim R. The tire T includes a tire 1 and a tube accommodated in the tire 1. The rim R includes an annular rim body 11 extending circumferentially about the wheel, and a pair of flange portions 12 extending radially outwards from axially opposite ends of the rim body 11 to retain the circumference of the tire 1. An air valve 4 for filling air into an air chamber 3 formed in the tube 2 is mounted to extend through an air valve mounting portion 13 formed at one place in a circumferential direction of the rim body, and is fixed by nuts 14 and 15 to the air valve mounting portion 13.

The inside of the tube 2 is divided by a partition wall 20 into the air chamber 3 located at a radially inner side and a sealant chamber 7 located at a radially outer side. A known liquid sealant 8 is previously filled in the sealant chamber 7. A pair of first thick portions 21 are integrally formed on a surface of the partition wall 20 facing the air chamber 3. A pair of second thick portions 22 capable of abutting against the first thick portions 21 are integrally formed on the tube 2 at locations near the pair of flange portions 12 of the rim R. The thickness $t_1$ of each of the first and second thick portions 21 and 22 is set about 1.5–3.0 times larger than thickness t of other portions of the tube 2.

The operation of this embodiment will be described below.

The sealant chamber 7 in the tube 2 is retained in a shape extending along an inner surface of the tire 1 by an air pressure in the air chamber 3. Thus, even if a centrifugal force is applied by the rotation of the wheel, the sealant 8 enclosed in the sealant chamber 7 does not move from the side to the outer periphery of the tube 2. Therefore, even if the sealant chamber 7 in the tube 2 gets a punctured wound radially or sideways by a nail or the like, the sealant 8 immediately fills such punctured wound for repairing the tube 2, thereby retarding the leakage of air from the air chamber 3.

The sealant 8 is retained in the sealant chamber 7 and cannot flow toward the air chamber 3 and hence, the air valve 4 and a pressure gauge applied to the air valve 4 are not clogged with the sealant 8.

Figure 2:
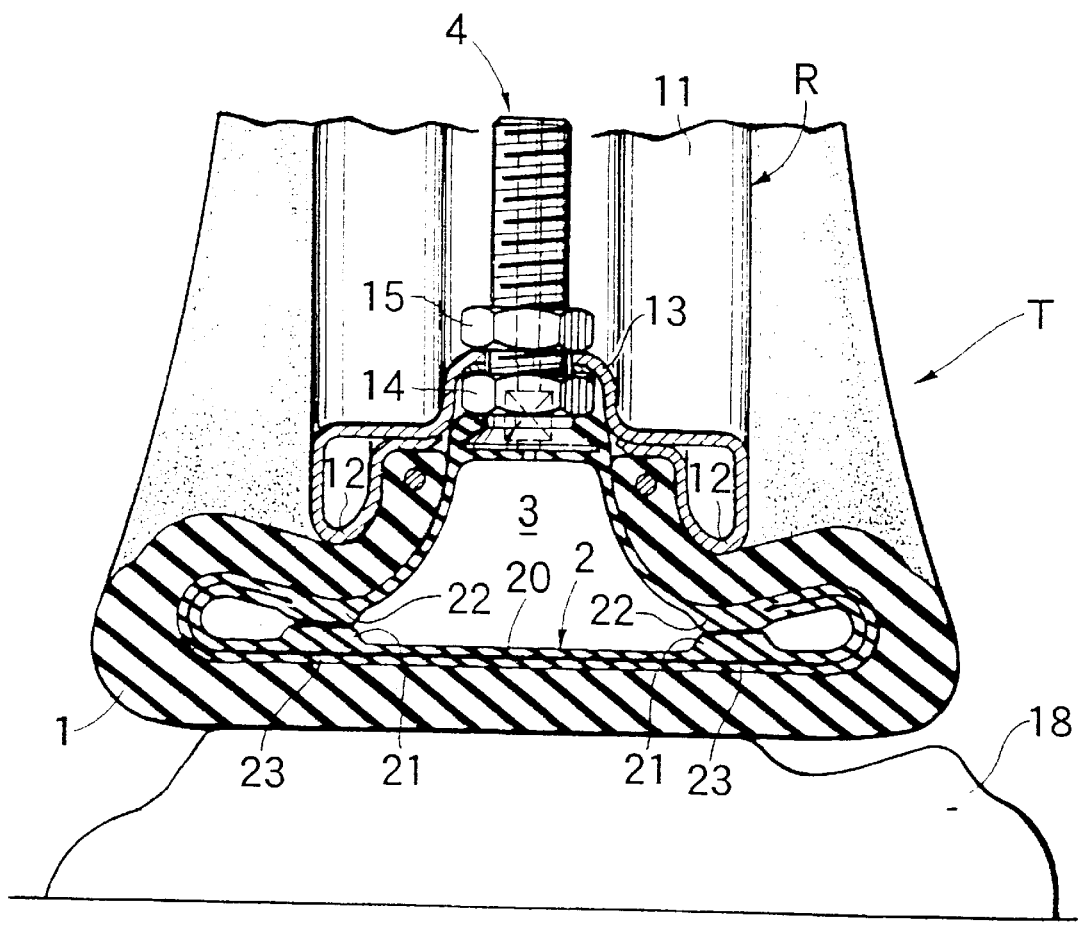

As shown in FIG. 2, if the tube-incorporated tire T runs upon an obstacle 18 on a road surface, and a shocking load is applied to the tire, portions of the tire 1 and the tube 2 are compressed radially by such load. At that time, the tire 1 and the tube 2 are caught under pressure between the obstacle 18 and the flange portions 12 of the rim R protruding radially outwards, so that the first and second thick portions 21 and 22 of the tube 2 abut against each other. But the first and second thick portions 21 and 22 having a high strength cannot be damaged. In addition, the thinner portions 23 abutting against the first thick portions 21 is protected against a damage, because the load is distributed to the first thick portions 21. Thus, it is possible to avoid the generation of a shock puncture by a simple structure that the first and second thick portions 21 and 22 having the diameter larger than those of other portions are merely formed in part on the tube 2. Moreover, the weight and manufacture cost of the tube-incorporated tire T cannot be largely increased.

Figure 3A:
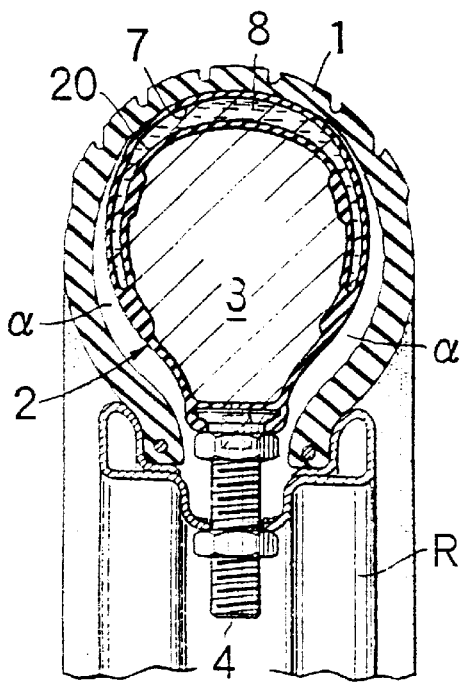
Figure 3B:
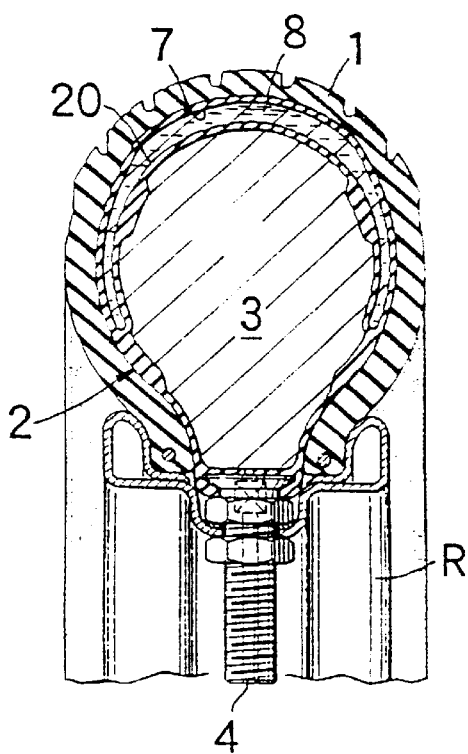

FIG. 3A shows a state in which the tube 2 has been mounted in the tire 1, but air is not yet filled in the air chamber 3 and the tube 2 is not yet expanded. At that time, a clearance a exists between the outer wall surface of the tube 2 and the inner wall surface of the tire 1. FIG. 3B shows an expanded state in which air has been filled in the air chamber 3 in the tube 2 through the air valve 4. In this state, the outer wall surface of the tube 2 and the inner wall surface of the tire 1 have been brought into close contact with each other by the expansion of the air chamber 3 to cause the clearance a to disappear.

The sectional expansion rate R of the tube 2 is given by a rate (R=B/A) of the length B of the outer circumference of the tube 2 in the expanded state (the outer circumferential length of the obliquely lined region shown in FIG. 3B) to length A of the outer circumference of the tube 2 in the free state (the outer circumferential length of the obliquely lined region shown in FIG. 3A). Incidentally, as an actual measure of obtaining this sectional expansion rate R, there can be listed one in which both lengths of outer circumference of the tube 2 in the expanded state and the free state are converted into the outer circumferential lengths of true circles, respectively, and the rate between radii of both the outer circumferential lengths is obtained. The sectional expansion rate R of the prior art tube shown in FIGS. 4A to 4C is about 120% –135%, whereas the sectional expansion rate R of the tube 2 according to the present invention is set at 105% smaller than that of the prior art tube. Therefore, if the tension of the partition wall 20 of the tube 2 when in service is considered, the tension of the partition wall is increased in the prior art tire in FIG. 4B in which the air chamber 3 has been largely expanded, whereas the tension of the partition wall is decreased in the embodiment in FIG. 3C in which the air chamber 3 is less expanded.

Figure 3C:
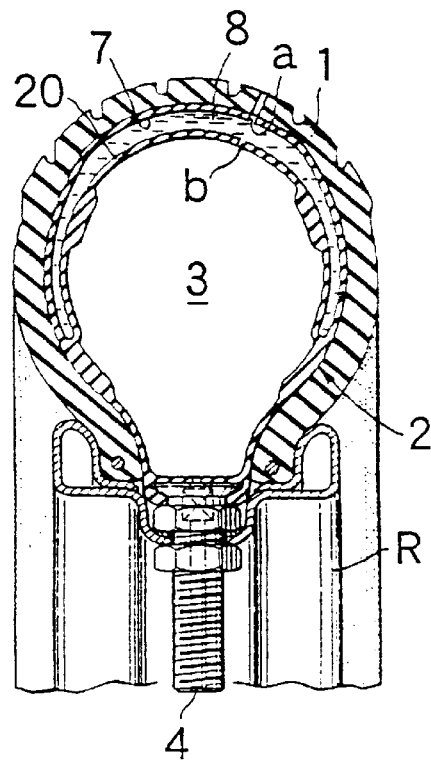
Figure 4A:
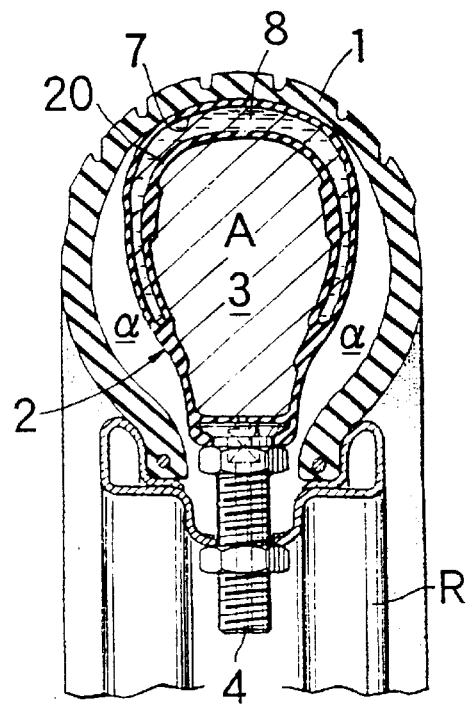
FIG. 4 is a view for explaining the operation when the prior art tube gets a punctured wound.
Figure 4B:
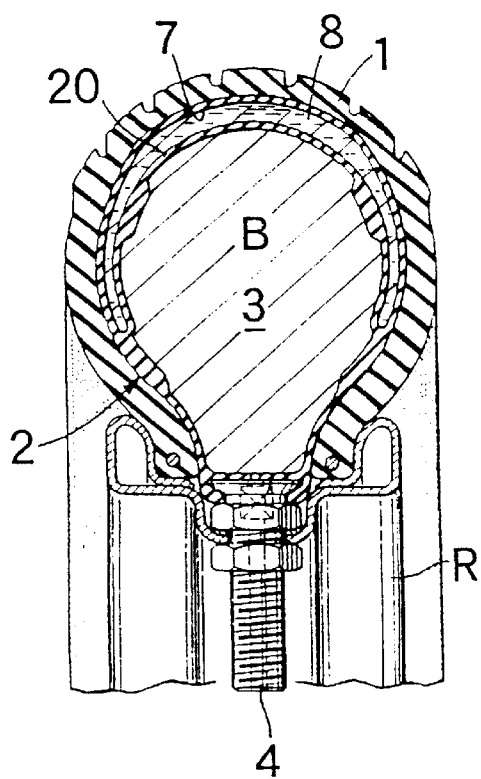
Figure 4C:
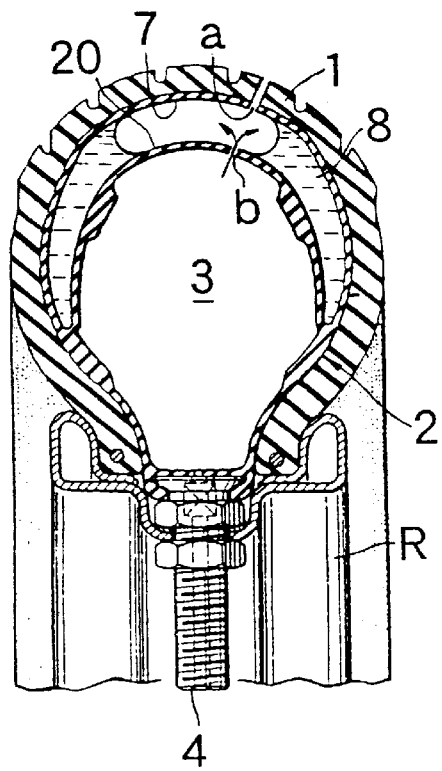

When nails or the like pierces the tire 1 and the tube 2, so that the sealant chamber 7 gets punctured wounds a and b at two points, as shown in FIGS. 3C and 4C, the partition wall 20, if the wheel is being rotated, is biased toward the sealant chamber 7 by a centrifugal force and hence, air in the air chamber 3 cannot flow out through the punctured wound b into the sealant chamber 7. However, in the prior art shown in FIG. 4C, when the rotation of the wheel has been stopped and the centrifugal has disappeared, the partition wall 20 with the large tension force applied thereto is intended to be contracted toward the air chamber 3 and hence, the air in the air chamber 3 flows through the punctured wound b into the sealant chamber 7, where it is mixed with the sealant 8. If the air is incorporated into the sealant 8 in this manner, the sealant 8 is obstructed by the air, whereby it is difficult to reach the punctured wounds a and b, or the flowability of the sealant 8 is degraded, resulting in a reduced sealing performance.

In contrast, in the embodiment of the tire shown in FIG. 3C, the partition wall 20 with only the small tension applied thereto has a weak tendency to contract toward the air chamber 3, so that little, if any, of the air in the air chamber 3 flows into the sealant chamber 7. Thus, the reduction in the sealing performance of the sealant 8 due to the mixture of the sealant 8 with the air is prevented.

Although the embodiment of the present invention has been described in detail, it will be understood that the present invention is not limited to the above-described embodiment, and various modifications may be made without departing from the subject matter and scope of the invention defined in claims.

For example, the sectional expansion rate R has been set at 105% in the embodiment, but rate R may be in a range of 100% to 110% and if it is in this range, an intended effect can be achieved.

What is claimed is:

1. A tube-incorporated tire comprising a tire mounted around an outer periphery of a rim, and a tube which is accommodated in a space defined by the rim and the tire and which is formed with an air chamber to be filled with air and a sealant chamber filled with a sealant, said air chamber and said sealant chamber being separated by a partition wall formed on said tube, said tube having a pair of first thick portions integrally formed on said partition wall, and a pair of second thick portions integrally formed on said tube at locations near a pair of flange portions of said rim, wherein upon application of a shocking load to said tire, said pair of first thick portions come into abutment against said pair of second thick portions, and wherein a ratio of a length of an outer circumference of a cross-section of the tube in an air-filled state to that in an air-unfilled state is set in a range of 100% to 110%.

* * * * *